US012450572B2

(12) United States Patent
Rudraiah et al.

(10) Patent No.: US 12,450,572 B2
(45) Date of Patent: Oct. 21, 2025

(54) SYSTEMS AND METHODS TO VALIDATE MAINTENANCE RECORDS AND PROVIDE CONTEXTUAL MAINTENANCE EVENT INFORMATION

(71) Applicant: Honeywell International Inc., Charlotte, NC (US)

(72) Inventors: Vasantha Rudraiah, Bangalore (IN); Imtiaz Elahi, Bangalore (IN); Kiran R, Hyderabad (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 356 days.

(21) Appl. No.: 18/167,264

(22) Filed: Feb. 10, 2023

(65) Prior Publication Data

US 2024/0220941 A1 Jul. 4, 2024

(30) Foreign Application Priority Data

Jan. 2, 2023 (IN) .............................. 202311000104

(51) Int. Cl.
*G06Q 30/00* (2023.01)
*G06Q 10/20* (2023.01)
(52) U.S. Cl.
CPC .................................. *G06Q 10/20* (2013.01)
(58) Field of Classification Search
None
See application file for complete search history.

(56) References Cited

U.S. PATENT DOCUMENTS 8,380,385 B2 2/2013 Yukawa et al.
9,672,497 B1 6/2017 Lewis et al.
(Continued)

FOREIGN PATENT DOCUMENTS

CN 102393732 A 3/2012
CN 103678992 A 3/2014
CN 113934758 A 1/2022

OTHER PUBLICATIONS

Reliability analysis of artificial intelligence systems using recurrent events data from autonomous vehicles. By: Min, Jie et al., In: Journal of the Royal Statistical Society: Series C (Applied Statistics), Aug. 2022 Applied Science & Technology Source. (Year: 2022).*

*Primary Examiner* — Matthew T Sittner
(74) *Attorney, Agent, or Firm* — ALSTON & BIRD LLP

(57) ABSTRACT

A method of validating a maintenance record associated with a vehicle, including: receiving, from a vehicle system, maintenance operation event data; recording graphical user interface (GUI) data associated with one or more maintenance displays and storing a recording of the GUI data in a memory; analyzing the maintenance operation event data using loadable diagnostic information to automatically translate at least one numeric or alphanumeric code into a natural language identification; correlating, with reference to the natural language identification, the maintenance operation event data and the recording of the GUI data and storing the correlated maintenance event data in the memory; detecting, at the system, a maintenance record dataset; determining, by comparing details of the maintenance record dataset with the correlated maintenance event data, whether a discrepancy exists between the maintenance record dataset and the correlated maintenance event data; and performing, responsive to determining that the discrepancy exists, an action.

14 Claims, 3 Drawing Sheets

(56) References Cited

U.S. PATENT DOCUMENTS

| | | | |
|---|---|---|---|
| 11,221,903 B2 | 1/2022 | Kono et al. | |
| 2008/0119981 A1* | 5/2008 | Chen | G07C 5/0825 |
| | | | 701/31.4 |
| 2011/0107315 A1* | 5/2011 | Bnayahu | G06F 8/433 |
| | | | 717/156 |
| 2013/0079972 A1* | 3/2013 | Lake | G07C 5/0808 |
| | | | 701/31.6 |
| 2016/0314627 A1* | 10/2016 | Fish | G07C 5/0808 |
| 2017/0083561 A1* | 3/2017 | Bump | G06F 16/22 |
| 2019/0039545 A1* | 2/2019 | Kumar | G07C 5/008 |
| 2019/0377624 A1* | 12/2019 | Li | G06F 40/279 |
| 2022/0337708 A1* | 10/2022 | Yamamoto | H04N 1/0009 |
| 2023/0362066 A1* | 11/2023 | Sanghvi | H04L 41/5019 |

* cited by examiner

SYSTEMS AND METHODS TO VALIDATE MAINTENANCE RECORDS AND PROVIDE CONTEXTUAL MAINTENANCE EVENT INFORMATION

CROSS-REFERENCE TO RELATED APPLICATION(S)

This application claims the benefit of priority to Indian Application No. 202311000104, filed Jan. 2, 2023, the entirety of which is incorporated by reference herein.

TECHNICAL FIELD

Various embodiments of the present disclosure relate generally to the field of maintenance log validation, and, more particularly, to systems and methods for validating the accuracy of maintenance events occurring on components associated with a vehicle.

BACKGROUND

Vehicles, such as aircraft, contain a variety of different components that need to be routinely monitored and maintained in order for the vehicle to operate safely and efficiently. Maintenance activities for these components are conventionally manually recorded by a working technician in an equipment maintenance log, which is a document that contains a list of all actions that have been performed on a vehicle component. Proper recording in the equipment maintenance log helps to ensure equipment longevity and higher resale value. It is not uncommon, however, for manual recording errors to occur, which may ultimately comprise the integrity of the maintenance log. These incomplete/faulty logs may, among other things, present technicians with additional difficulties when attempting to troubleshoot complex faults (i.e., those faults arising out of multiple potential error points during operation of component).

The present disclosure is accordingly directed to overcoming one or more of these above-referenced issues. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for validating maintenance records associated with a vehicle and for providing a more optimal way to troubleshoot complex faults.

In one embodiment, a method of validating a maintenance record for a vehicle is disclosed. The method may include: receiving, from a system of the vehicle, maintenance operation event data; recording graphical user interface (GUI) data associated with one or more maintenance displays and storing a recording of the GUI data in a memory; analyzing the maintenance operation event data using loadable diagnostic information to automatically translate at least one numeric or alphanumeric code into a natural language identification; correlating, with reference to the natural language identification, the maintenance operation event data and the recording of the GUI data and storing the correlated maintenance event data in the memory; detecting, at the system, a maintenance record dataset; determining, by comparing details of the maintenance record dataset with the correlated maintenance event data, whether a discrepancy exists between the maintenance record dataset and the correlated maintenance event data; and performing, responsive to determining that the discrepancy exists, an action.

In accordance with another embodiment, a computer system for validating a maintenance record for a vehicle is disclosed. The computer system may include: at least on processor; at least one database; and a server in network communication with the at least one database, the server configured to perform operations including: receiving, from a system of the vehicle, maintenance operation event data; recording graphical user interface (GUI) data associated with one or more maintenance displays and storing a recording of the GUI data in a memory; analyzing the maintenance operation event data using loadable diagnostic information to automatically translate at least one numeric or alphanumeric code into a natural language identification; correlating, with reference to the natural language identification, the maintenance operation event data and the recording of the GUI data and storing the correlated maintenance event data in the memory; detecting, at the system, a maintenance record dataset; determining, by comparing details of the maintenance record dataset with the correlated maintenance event data, whether a discrepancy exists between the maintenance record dataset and the correlated maintenance event data; and performing, responsive to determining that the discrepancy exists, an action.

In accordance with another embodiment, a non-transitory computer-readable medium storing computer-executable instructions which, when executed by a server in network communication with at least one database, cause the server to perform operations including: receiving, from a system of the vehicle, maintenance operation event data; recording graphical user interface (GUI) data associated with one or more maintenance displays and storing a recording of the GUI data in a memory; analyzing the maintenance operation event data using loadable diagnostic information to automatically translate at least one numeric or alphanumeric code into a natural language identification; correlating, with reference to the natural language identification, the maintenance operation event data and the recording of the GUI data and storing the correlated maintenance event data in the memory; detecting, at the system, a maintenance record dataset; determining, by comparing details of the maintenance record dataset with the correlated maintenance event data, whether a discrepancy exists between the maintenance record dataset and the correlated maintenance event data; and performing, responsive to determining that the discrepancy exists, an action.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that avionics data may be retrieved efficiently from legacy and resource constrained platforms though a distributed data acquisition process.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
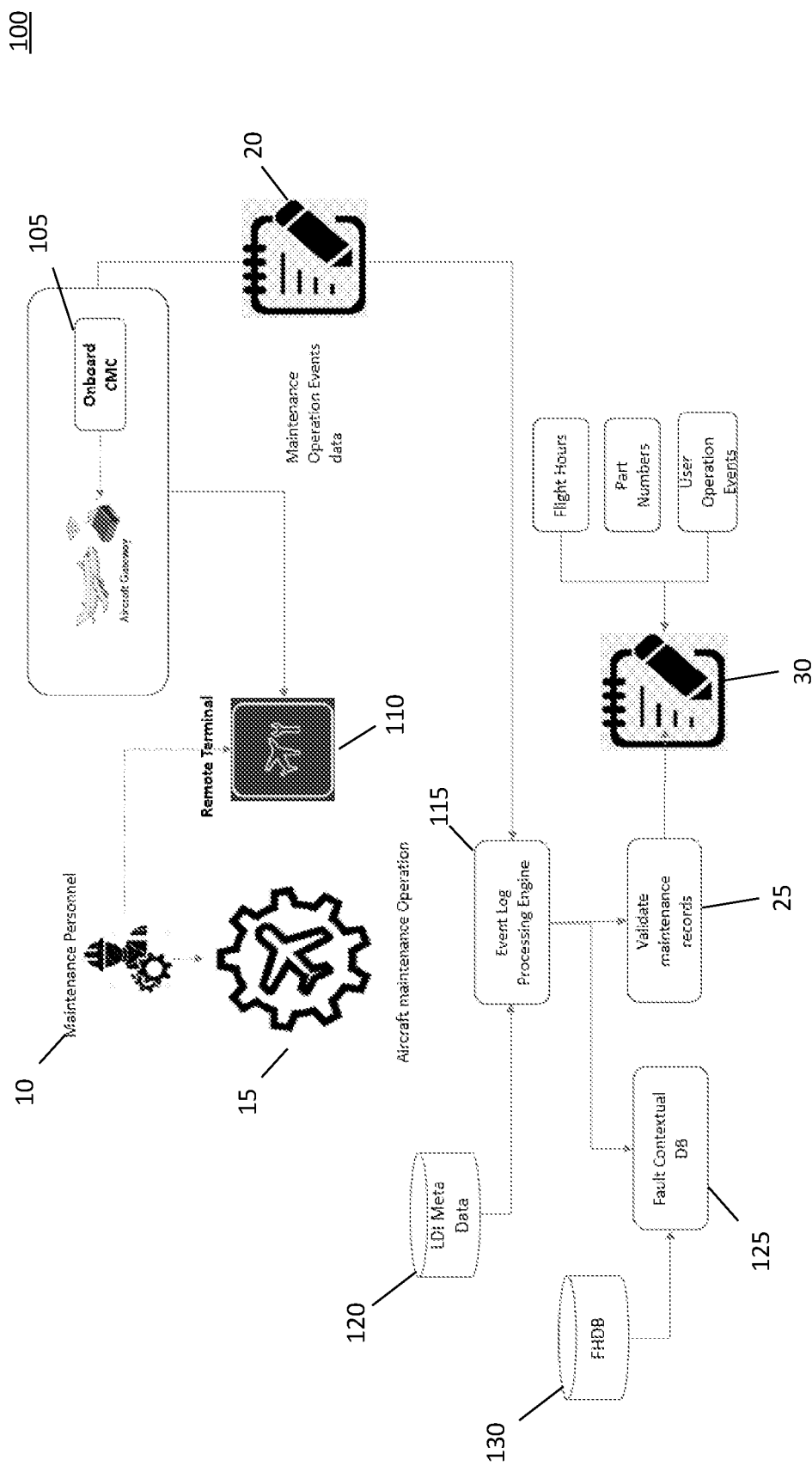
FIG. 1 depicts an system environment, according to one or more embodiments of the present disclosure.

The following embodiments describe systems and methods for validating maintenance log records and providing contextual details to resolve complex faults. As described above, there is a need to preserve the integrity of equipment maintenance logs in order to ensure that a vehicle continues to operate safely and efficiently and to also provide technicians with all of the contextual information they need to address equipment issues in an effective and timely manner.

In the context of this application, a "vehicle" may refer to virtually any type of object utilized to transport people or goods, e.g., motor vehicles (e.g., cars, trucks, buses, motorcycles, etc.), railed vehicles (e.g., trains, etc.), amphibious vehicles (e.g., boats, etc.), aircraft (e.g., planes, helicopters, etc.), spacecraft, autonomous or semi-autonomous vehicles, and the like. For simplicity purposes, the vehicle described throughout the remainder of the specification is an airplane. However, it is important to note that this designation is not limiting and the embodiments disclosed herein may be applicable to other vehicle types.

As previously alluded to above, the completeness and accuracy of equipment maintenance logs is critical to the overall operation and efficiency of a vehicle. In ideal practice, technicians would record all important details about the maintenance tasks performed along with any anomalies and faults seen. During live maintenance, however, technicians may fail to record all relevant details associated with the maintenance operation. This may result for a number of different reasons. For instance, technicians often have limited time (e.g., 30 minutes, 45 minutes, etc.) to turn around the aircraft to bring it to a dispatch condition. Under these time constraints, technicians generally devote their time to completing the maintenance task rather than recording each action performed in furtherance of that task. Other reasons why an equipment maintenance log may be faulty include: incomplete entries (e.g., where all of the details associated with a maintenance task were not recorded, etc.), erroneous entries (e.g., in which the incorrect fault was listed as fixed, etc.), forgotten entries (e.g., where a technician may have taken mental notes of details of a maintenance task but had forgotten some of them, etc.), and the like.

Incomplete and/or erroneous maintenance logs may lead to further difficulties. For instance, troubleshooting complex faults demands an accurate understanding of the contextual history of the equipment-at-issue and/or other pieces of equipment that are associated therewith. If the contextual history is unavailable or inaccurate, it may be burdensome and/or time-consuming for the technician to identify the root of the issue and to ultimately resolve the problem.

Accordingly, in view of the foregoing, the following embodiments describe systems and methods for validating vehicle maintenance records and providing contextual details to resolve complex faults. According to certain aspects of the present disclosure, maintenance operation event data, which may include system events or faults as well as user interactions with a graphical user interface (GUI) of a remote terminal, may be detected and recorded by a function of a vehicle system. This data may then be correlated and thereafter utilized to validate the details of a maintenance record. Additionally or alternatively, the correlated data may further be annotated with troubleshooting data obtained from a fault history database and natural language fault/event identifications to create a contextual vehicle maintenance log, which may be displayed to one or more vehicle maintenance personnel to enable them to solve complex faults.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Referring now to the appended drawings, FIG. 1 shows an overview of an exemplary system according to one or more embodiments of the present disclosure. The system 100 may include a Central Maintenance Computing Function (CMCF) 105, a remote terminal 110, an event log processing engine 115, loadable diagnostic information metadata 120, a contextual fault database 125, and a fault history database 130.

Many conventional vehicles contain maintenance systems that may be configured to provide diagnostic information about the aircraft and may collect the faults from the various member systems. In conventional practice, these systems are extensively used by the technicians for aircraft maintenance and assists in troubleshooting and repair. A technician may access these maintenance systems through a user interface known as a Remote Terminal. With the help of the Remote Terminal, the technician can access various system functions such as Existing Faults, Flight Deck Effects, Fault History, System Configuration, Reports and so on.

According to the embodiments of the disclosure, a CMCF 105 is provided that is located on board the vehicle that may perform all of the foregoing functions as well as record and store all of the events associated with various maintenance operations as those maintenance activities are detected. More particularly, maintenance personnel 10 performing maintenance operations 15 on a vehicle may interact with a remote terminal 110, which is associated with the CMCF 105, to facilitate the maintenance operation 15. For instance, maintenance personnel 10 may run various diagnostic tests, examine various fault reports, etc., using the remote terminal 110. In an embodiment, the CMCF 105 may record all detected maintenance operation event data (e.g., all detected faults, maintenance-related activities, and/or events or reactions resulting therefrom, etc.) 20 as well as the interactions a user may have with one or more maintenance displays of a remote terminal 110 (i.e., the CMCF 105 may record the graphical user interface (GUI) data associated with the remote terminal or other displays). Ultimately, the logs generated by the CMCF 105 that are based at least on these two datasets may be utilized to validate manually updated maintenance records, as further described herein. In an embodiment, the CMCF 105 may be located onboard the vehicle and may include a data transfer system, an input/output processor, a memory device, and a control processing system.

In an embodiment, the event log processing engine 115 may be configured to receive the recorded maintenance operation event data 20 and the recorded GUI data from the CMCF 105. In an embodiment, the data captured and recorded by CMCF 105 may initially be in a cryptic format. For example, the recorded data may initially be presented as system-generated numeric and/or alphanumeric event and/or codes. In such a format, it may not be readily understandable to a user. Accordingly, the event log processing engine 115 may utilize loadable diagnostic information (LDI) metadata 120 to analyze the maintenance operation event data 20 and automatically translate one or more numeric and/or alphanumeric event or fault codes into natural language event or fault identifications that are in an industry acceptable textual format. In an embodiment, this translation process may occur onboard the vehicle via the CMCF 105 or, alternatively, may occur at another location. For instance, the CMCF 105 may transmit all recorded data to a ground station, which may thereafter leverage specialized software to convert the digital data into an industry acceptable format.

In an embodiment, the event log processing engine 115 may also correlate the maintenance operation event data 20 with the recorded GUI data. In an embodiment, the correlation may be facilitated in one or more different ways. For instance, in an embodiment, the event log processing engine 115 may identify one or more time codes in the maintenance operation event data 20 and in the recorded GUI data. Thereafter, the event log processing engine 115 may utilize these "time stamps" to match each recorded user interaction with the remote terminal to a corresponding detected maintenance event. As a non-limiting example of the foregoing, the event log processing engine 115 may detect, upon analysis of the recorded GUI data, that an icon displayed on the maintenance interface was selected by a user at Time X to initiate a particular diagnostic test on a vehicle component. The event log processing engine 115 may also identify that certain vehicular and/or system-based actions (e.g., opening and closing of a valve, transmission of digital instructions to open and close a valve, etc.) were detected at Time Y, which is a later time point occurring shortly after Time X (e.g., seconds later, minutes later, etc.). Based on the proximity in time, the event log processing engine 115 may correlate the recorded GUI action with the recorded maintenance operation event. Such a correlation may provide a confirmation that a user action generated a corresponding system reaction, which serve as an indication that a certain maintenance task was performed.

In an embodiment, certain time-based correlations may be disregarded by the event log processing engine 115 if the correlation is contextually inconsistent. More particularly, a maintenance operation event and a user interaction with a GUI may not be correlated together, despite being proximate in time, if the maintenance operation event would not have feasibly resulted from the GUI interaction. For example, a user GUI interaction to perform a system check on fuel level may be detected proximally to a detection that emergency aircraft lights were actuated. Although proximally occurring, the event log processing engine 115 may not correlate these two events because the latter would not logically be derived from the former. Additionally or alternatively, a temporal correlation may not be made if a maintenance operation event was detected to occur prior to a user interaction with the GUI. More particularly, the user's interaction with the GUI generally initiates the back-end maintenance operation event. If the maintenance operation event was detected prior to the GUI interaction, the event log processing engine 115 may not correlate the two events.

In an embodiment, the correlated maintenance event data ("correlated data") may thereafter be utilized to perform a validation operation 25 on a maintenance record 30. In an embodiment, the maintenance record 30 may contain manually provided indications (e.g., from a working technician/maintenance personnel 10) of the details associated with one or more maintenance operations (e.g., flight hours, part numbers, user operation events, etc.). In an embodiment, the validation operation 25 may occur manually. For example, an individual may manually compare the data in the maintenance record against the correlated data. Alternatively, in another embodiment, the validation may occur automatically. For example, CMCF 105 may analyze the details contained in a digital version of the maintenance record and compare those details against others contained in the correlated data. In an embodiment, the system 100 may be configured to initiate the validation operation 25 at predetermined intervals (e.g., each day, each week, etc.) or in response to the detection of predetermined events (e.g., each time the maintenance record is updated, each time the aircraft has completed a flight, etc.).

In an embodiment, a contextual fault database (CFDB) 125 may be configured to store contextual vehicle maintenance logs. In this regard, the correlated data may be transmitted from the event log processing engine 115 to the CFDB 125, at which point the correlated data may be annotated with troubleshooting data contained in the FHDB 130 to generate a contextual vehicle maintenance log. In an embodiment, the generated contextual vehicle maintenance log may thereafter be displayed to maintenance personnel 10. The maintenance personnel 10 may thereafter utilize the context-based information to more quickly and efficiently resolve complex system faults. More particularly, with the help of the contextual vehicle maintenance log, maintenance personnel 10 may have access to significantly more information such as User Interface Events, Fault Reports/FDE Events, Ground Test/Special Function Events, BITE events, System Configuration Events, Flight phase and Mastership Events, Service Interface Failure Events, Reports Events, Rigging and Input Monitoring Events, and the like.

Figure 2:
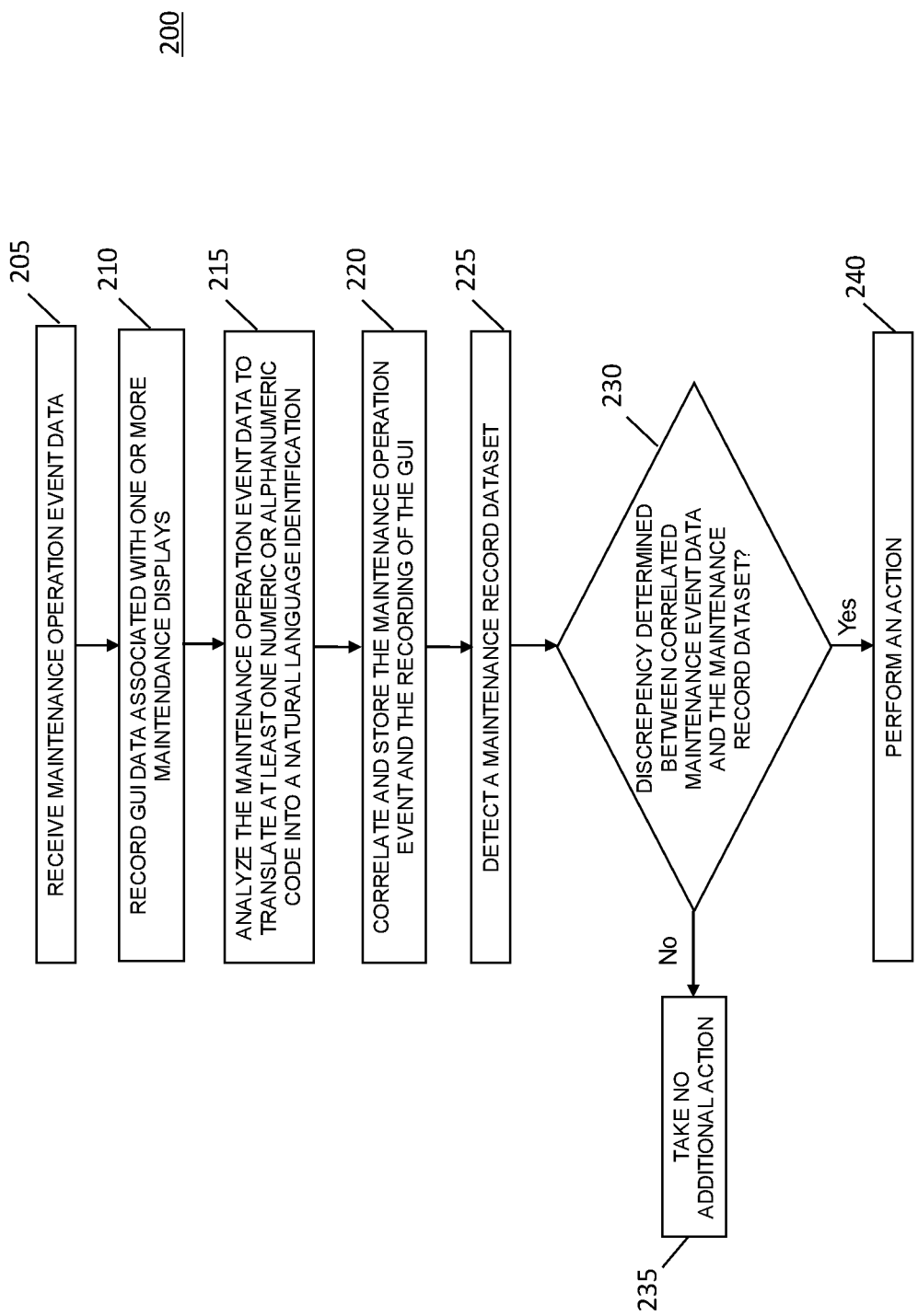
FIG. 2 depicts a flowchart of an exemplary method for validating a maintenance record for a vehicle, according to one or more embodiments of the present disclosure.

Turning now to FIG. 2, an exemplary process flow 200 is provided for validating maintenance logs and generating a contextual fault database, according to one or more embodiments of the present disclosure. The exemplary process flow 200 may be implemented by exemplary system 100 and the components thereof, as previously described above.

At step 205, the CMCF 105 associated with the system 100 may receive maintenance operation event data. In an embodiment, the maintenance operation event data 20 may contain various types of data (e.g., fault data, maintenance event data, other types of system operation data, etc.) identifying the details associated with at least one vehicle fault and/or maintenance event. For example, the maintenance operation event data 20 may contain details associated with a detected system fault and/or any other detected system events that may occur in furtherance of remedying the system fault. In an embodiment, user interaction events associated with a GUI of a remote terminal may also be captured in the maintenance operation event data.

At step 210, the CMCF 105 may record GUI data associated with one or more maintenance displays and store a recording of the GUI data in a memory of the system 100. For example, the CMCF 105 may record the interactions maintenance personnel 10 may have with a remote terminal 110 as they run system diagnostics and troubleshoot faults. In this regard, the CMCF 105 may record various types of page navigation information (e.g., the icons selected, values changed, information entered, scrolling motion of a cursor, etc.) performed by the maintenance personnel 10 on the GUI of the remote terminal 110.

At step 215, the maintenance operation event data 20 may be analyzed by an event log processing engine 115, with the utilization of LDI metadata 120, to translate the cryptic digital data associated with the maintenance operation event data 20. In this regard, the event log processing engine 115 may translate at least one numeric or alphanumeric code (e.g., a fault code, a maintenance event code, etc.) in a natural language identification (e.g., a natural language fault identification, a natural language event identification, etc.).

At step 220, the event log processing engine 115 may correlate the maintenance operation event data, having the natural language identification translation, with the recorded GUI data. In an embodiment, the correlation may be a temporal correlation, in which a maintenance operation event is correlated with a user GUI interaction based upon an identification that the maintenance operation event and the user GUI interaction shared a predetermined level of temporal similarity (e.g., they occurred within seconds of each other, etc.). An embodiment may not correlate a maintenance operation event with a user GUI interaction if the two are contextually unrelated, as previously described above.

At step 225, a maintenance record dataset may be detected by the system 100. In an embodiment, the maintenance record dataset may comprise manually provided annotations associated with the identification of various vehicle faults and/or with the identification of various maintenance operations performed to address those faults. In an embodiment, detection of the maintenance record dataset may correspond to a detection that an update is made to the maintenance record dataset (e.g., by a maintenance personnel 10).

At step 230, an embodiment may determine whether a discrepancy exists between the maintenance record dataset and the correlated maintenance event data. In an embodiment, the discrepancy may be ascertained by comparing details associated with the correlated maintenance event data with the details in the maintenance record dataset. In an embodiment, a discrepancy may correspond to an identification that certain data present in the correlated maintenance event data is not present in the maintenance record dataset. For example, the correlated maintenance event data may contain an identification that a system diagnostic test was conducted at 5:00 PM but the maintenance record dataset may not contain any indication that such a test was performed. In another embodiment, a discrepancy may correspond to an identification that certain data present in the correlated maintenance event data is incorrectly presented in the maintenance record dataset. For example, the correlated maintenance event data may contain an identification that a system diagnostic test was performed on vehicle component 1 at 5:00 PM but the maintenance record dataset may indicate that the system diagnostic test was performed on vehicle component 2 at 5:00 PM.

Responsive to determining, at step 230, that a discrepancy does not exist between the correlated maintenance event data and the maintenance record dataset, an embodiment may, at step 235, take no additional action. Conversely, responsive to determining, at step 230, that the discrepancy does exist, an embodiment may, at step 240, perform a particular action. In an embodiment, the performance of the action may correspond to the presentation of a notification (e.g., to one or more maintenance personnel 10 or other designated individuals, etc.) that the discrepancy exists. In an embodiment, the notification may contain an indication of the type of discrepancy detected (e.g., an incomplete entry, an erroneous entry, etc.). Additionally or alternatively, the performance of the action may correspond to the dynamic implementation of a visual distinction in the maintenance record dataset. For example, the system 100 may dynamically highlight or annotate the portions in the maintenance record dataset that are at issue so that they may be more easily seen.

In an optional embodiment, the maintenance operation event data 20 may contain fault data associated with at least one vehicle fault. This fault data may be utilized by the system to query a FHDB 130 to retrieve troubleshooting data for remedying the vehicle fault. In an embodiment, the retrieved troubleshooting data, along with the natural language identification associated with the maintenance operation event data, may be utilized to annotate the correlated maintenance event data to generate a contextual vehicle maintenance log. In an embodiment, the contextual vehicle maintenance log may be saved in the CFDB 125 and may be accessed by and presented to a user so that they may have the contextual information needed to solve complex faults.

In general, any process discussed in this disclosure that is understood to be computer-implementable, such as the process illustrated in FIG. 2, may be performed by one or more processors of a computer server. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer server. A processor may be a central processing unit (CPU), a graphics processing unit (GPU), or any suitable types of processing unit.

A computer system may include one or more computing devices. If the one or more processors of the computer system are implemented as a plurality of processors, the plurality of processors may be included in a single computing device or distributed among a plurality of computing devices. If a computer server comprises a plurality of computing devices, the memory of the computer server may include the respective memory of each computing device of the plurality of computing devices.

Figure 3:
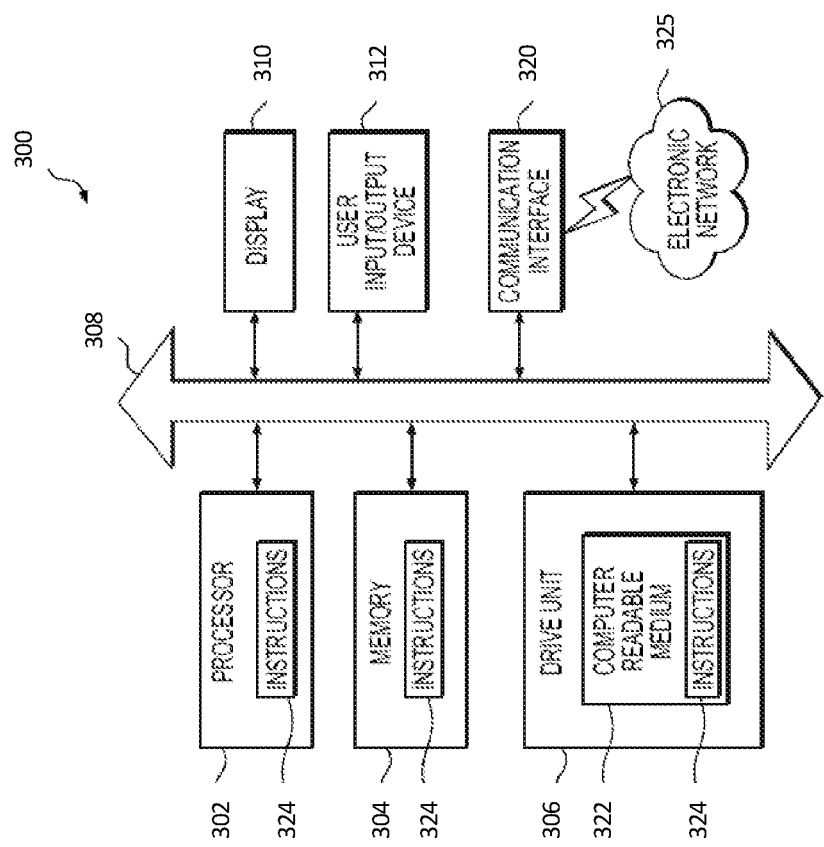
FIG. 3 depicts an exemplary computing server, according to one or more embodiments.

FIG. 3 is a simplified functional block diagram of a computer system 300 that may be configured as a computing device for executing the process illustrated in FIG. 2, according to exemplary embodiments of the present disclosure. FIG. 3 is a simplified functional block diagram of a computer that may be configured as according to exemplary embodiments of the present disclosure. In various embodiments, any of the systems herein may be an assembly of hardware including, for example, a data communication interface 320 for packet data communication. The platform also may include a central processing unit ("CPU") 302, in the form of one or more processors, for executing program instructions. The platform may include an internal communication bus 308, and a storage unit 306 (such as ROM, HDD, SDD, etc.) that may store data on a computer readable medium 322, although the system 300 may receive programming and data via network communications. The system 300 may also have a memory 304 (such as RAM) storing instructions 324 for executing techniques presented herein, although the instructions 324 may be stored temporarily or permanently within other modules of system 300 (e.g., processor 302 and/or computer readable medium 322). The system 300 also may include input and output ports 312 and/or a display 310 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method of validating a maintenance record for a vehicle, the method comprising:
   receiving, from a system of the vehicle, maintenance operation event data;
   recording graphical user interface (GUI) data associated with one or more maintenance displays and storing a recording of the GUI data in a memory, wherein the maintenance operation event data is received by an event log processing engine from a central maintenance computing device located onboard the vehicle and the GUI data is recorded by the event log processing engine using a remote terminal;

correlating the maintenance operation event data and the recording of the GUI data and storing the correlated maintenance event data in the memory, wherein the correlating comprises:

correlating a maintenance operation event in the maintenance operation event data with a user action in the recording of the GUI data responsive to identifying that a first time code associated with the maintenance operation event shares a predetermined level of temporal similarity with a second time code associated with the user action or that a context associated with the maintenance operation event is consistent with the user action;

detecting, at the system, a maintenance record dataset;

determining, by comparing details of the maintenance record dataset with the correlated maintenance event data, whether a discrepancy exists between the maintenance record dataset and the correlated maintenance event data;

performing, responsive to determining that the discrepancy exists, an action;

transmitting the correlated maintenance event data to a contextual fault database, wherein the contextual fault database is configured to generate a contextual vehicle maintenance log by annotating the correlated maintenance event data with troubleshooting data; and causing the contextual vehicle maintenance log to be displayed on the remote terminal.

2. The computer-implemented method of claim 1, wherein the maintenance operation event data comprises fault data for at least one vehicle fault.

3. The computer-implemented method of claim 1, further comprising:

analyzing the maintenance operation event data using loadable diagnostic information to automatically translate at least one numeric or alphanumeric code into a natural language identification, wherein the at least one numeric or alphanumeric code corresponds to a fault code or a maintenance event and wherein the natural language identification corresponds to a natural language fault identification or a natural language event identification.

4. The computer-implemented method of claim 1, wherein the correlating comprises correlating by referencing one or more time codes in the maintenance operation event data and the recording of the GUI data.

5. The computer-implemented method of claim 1, wherein the correlating comprises correlating the maintenance operation event in the maintenance operation event data with the user action in the recording of the GUI data responsive to identifying that the maintenance operation event occurred after the user action.

6. The computer-implemented method of claim 1, wherein the performing the action comprises presenting a notification that the discrepancy exists.

7. The computer-implemented method of claim 6, wherein the notification comprises an indication of a type of the discrepancy and wherein the type of the discrepancy is one of an incomplete entry or an erroneous entry.

8. A system for validating a maintenance record for a vehicle, comprising:
at least on processor;
at least one database; and
a server in network communication with the at least one database, the server configured to perform operations including:

receiving, from a system of the vehicle, maintenance operation event data;

recording graphical user interface (GUI) data associated with one or more maintenance displays and storing a recording of the GUI data in a memory, wherein the maintenance operation event data is received by an event log processing engine from a central maintenance computing device located onboard the vehicle and the GUI data is recorded by the event log processing engine using a remote terminal;

correlating the maintenance operation event data and the recording of the GUI data and storing the correlated maintenance event data in the memory, wherein the correlating comprises:

correlating a maintenance operation event in the maintenance operation event data with a user action in the recording of the GUI data responsive to identifying that a first time code associated with the maintenance operation event shares a predetermined level of temporal similarity with a second time code associated with the user action or that a context associated with the maintenance operation event is consistent with the user action;

detecting, at the system, a maintenance record dataset;

determining, by comparing details of the maintenance record dataset with the correlated maintenance event data, whether a discrepancy exists between the maintenance record dataset and the correlated maintenance event data;

performing, responsive to determining that the discrepancy exists, an action;

transmitting the correlated maintenance event data to a contextual fault database, wherein the contextual fault database is configured to generate a contextual vehicle maintenance log by annotating the correlated maintenance event data with troubleshooting data; and causing the contextual vehicle maintenance log to be displayed on the remote terminal.

9. The system of claim 8, wherein the maintenance operation event data comprises fault data for at least one vehicle fault.

10. The system of claim 8, wherein the operations further include:

analyzing the maintenance operation event data using loadable diagnostic information to automatically translate at least one numeric or alphanumeric code into a natural language identification, wherein the at least one numeric or alphanumeric code corresponds to a fault code or a maintenance event and wherein the natural language identification corresponds to a natural language fault identification or a natural language event identification.

11. The system of claim 8, wherein the correlating comprises correlating by referencing one or more time codes in the maintenance operation event data and the recording of the GUI data.

12. The system of claim 8, wherein the correlating comprises correlating the maintenance operation event in the maintenance operation event data with the user action in the recording of the GUI data responsive to identifying that the maintenance operation event occurred after the user action.

13. The system of claim 8, wherein the performing the action comprises presenting a notification that the discrepancy exists and wherein the notification comprises an indication of a type of the discrepancy and wherein the type of the discrepancy is one of an incomplete entry or an erroneous entry.

14. A non-transitory computer-readable medium storing computer-executable instructions which, when executed by a server in network communication with at least one database, cause the server to perform operations comprising:
 receiving, from a system of a vehicle, maintenance operation event data;
 recording graphical user interface (GUI) data associated with one or more maintenance displays and storing a recording of the GUI data in a memory, wherein the maintenance operation event data is received by an event log processing engine from a central maintenance computing device located onboard the vehicle and the GUI data is recorded by the event log processing engine using a remote terminal;
 correlating the maintenance operation event data and the recording of the GUI data and storing the correlated maintenance event data in the memory, wherein the correlating comprises:
  correlating a maintenance operation event in the maintenance operation event data with a user action in the recording of the GUI data responsive to identifying that a first time code associated with the maintenance operation event shares a predetermined level of temporal similarity with a second time code associated with the user action;
 detecting, at the system, a maintenance record dataset;
 determining, by comparing details of the maintenance record dataset with the correlated maintenance event data, whether a discrepancy exists between the maintenance record dataset and the correlated maintenance event data;
 performing, responsive to determining that the discrepancy exists, an action;
 transmitting the correlated maintenance event data to a contextual fault database, wherein the contextual fault database is configured to generate a contextual vehicle maintenance log by annotating the correlated maintenance event data with troubleshooting data; and
 causing the contextual vehicle maintenance log to be displayed on the remote terminal.

\* \* \* \* \*